(12) United States Patent
Kim et al.

(10) Patent No.: US 12,547,201 B1
(45) Date of Patent: Feb. 10, 2026

(54) AUTOMOBILE PEDAL COVERS

(71) Applicant: SPIGEN KOREA CO., LTD., Seoul (KR)

(72) Inventors: Tae Heon Kim, Seoul (KR); Gang Il Park, Uiwang-si (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 19/249,893

(22) Filed: Jun. 25, 2025

(51) Int. Cl.
G05G 1/48 (2008.04)
G05G 1/483 (2008.04)

(52) U.S. Cl.
CPC .................................. G05G 1/483 (2013.01)

(58) Field of Classification Search
CPC ................................ G05G 1/48; G05G 1/483
See application file for complete search history.

(56) References Cited

U.S. PATENT DOCUMENTS

| | | | | |
|---|---|---|---|---|
| 1,388,935 A | * | 8/1921 | De Tamble | G05G 1/483 |
| | | | | 15/265 |
| 1,455,675 A | * | 5/1923 | Sinclair | G05G 1/483 |
| | | | | 74/563 |
| 1,584,659 A | * | 5/1926 | Schacht | G05G 1/483 |
| | | | | 15/265 |
| 5,884,534 A | * | 3/1999 | Knoll | G05G 1/483 |
| | | | | 74/562 |
| 6,622,592 B2 | * | 9/2003 | Lee | G05G 1/483 |
| | | | | 74/561 |
| D1,049,993 S | * | 11/2024 | Koo | D12/174 |
| 2025/0085736 A1 | | 3/2025 | Xiao | |

FOREIGN PATENT DOCUMENTS

| | | | | |
|---|---|---|---|---|
| DE | 10032574 A1 | * | 1/2002 | ............... B60T 7/06 |
| DE | 10034525 A1 | * | 1/2002 | ............ G05G 1/483 |
| DE | 102023209134 A1 | * | 3/2025 | ........... B60K 26/021 |
| FR | 2891788 A1 | * | 4/2007 | ............. G05G 1/483 |
| KR | 200483028 Y1 | * | 4/2017 | ............... G05G 1/48 |

* cited by examiner

*Primary Examiner* — Adam D Rogers
(74) *Attorney, Agent, or Firm* — Bridgeway IP Law Group, PLLC; Jihun Kim

(57) ABSTRACT

Devices and products for automotive pedal covers are described. According to one embodiment, a pedal cover for automotive pedal comprises an elastic pad which includes a plurality of anti-slip protrusions on an outer surface thereof, two edge walls integrally formed on left and right edges of an inner surface of the elastic pad, and two partition walls integrally formed on the inner surface of the elastic pad adjacent to the two edge walls to form two channels, wherein a first channel is formed between a right edge wall of the two edge walls and a right partition wall of the two partition walls and a second channel is formed between a left edge wall of the two edge walls and a left partition wall of the two partition walls.

20 Claims, 13 Drawing Sheets

B-B'

D-D'

AUTOMOBILE PEDAL COVERS

FIELD

The present disclosure relates to pedal covers attachable to automobile pedals, more particularly automobile pedal covers with each pedal cover suitable for accommodating various automobile pedals of similar sizes.

BACKGROUND

There are typically three pedals in engine and/or transmission vehicles, namely an accelerator pedal, a brake pedal, and a clutch pedal. The accelerator or gas pedal controls the amount of fuel and air sent to the engine, thus determining how fast the vehicles travel. Pressing it increases the engine's power output. The brake pedal is used to slow down or stop the vehicles. When pressed, it engages the braking system to reduce the vehicles' speed. The clutch pedal is used to disengage the engine from the wheels, allowing the driver to change gears. Pressing the clutch pedal allows the driver to shift to a different gear without stalling the engine. For electric vehicles, there are typically two pedals, namely the accelerator pedal and the brake pedal.

Pedal covers, or pedal pads, are accessories that cover the vehicles' brake, clutch, or accelerator pedals. They are typically made of materials like aluminum alloy or non-slip rubber and are designed to enhance grip and prevent slippage, improve the aesthetic appeal of the vehicles' interior, and potentially protect the pedals. Many pedal covers feature a textured or non-slip surface, which increases friction between the foot and the pedal, making it easier to control the vehicles, especially in wet or muddy conditions. The pedal covers can add a sporty or customized look to the vehicles' interior, enhancing the visual appeal.

Some pedal covers are designed to protect the pedals from wear and tear, potentially prolonging their lifespan. By increasing the contact area of the pedals, the pedal covers can make it easier for the drivers to control the vehicles, especially when using hand controls or for drivers with limited mobility. Some users find that the pedal covers reduce foot fatigue, as they provide a more secure and comfortable grip. In some cases, the pedal covers can prevent accidental pedal presses, which can be particularly helpful for drivers with involuntary leg movements.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure includes multiple embodiments of pedal covers for accommodating automobile pedals of slightly different sizes. According to one embodiment, a pedal cover for automotive pedal comprises an elastic pad which comprises a plurality of anti-slip protrusions on an outer surface thereof, two edge walls integrally formed on left and right edges of an inner surface of the elastic pad and two partition walls integrally formed on the inner surface of the elastic pad adjacent to the two edge walls to form two channels, wherein a first channel is formed between a right edge wall of the two edge walls and a right partition wall of the two partition walls and a second channel is formed between a left edge wall of the two edge walls and a left partition wall of the two partition walls, and wherein the right partition wall is bent toward the right edge wall via the first channel and the left partition wall is bent toward the left edge wall via the second channel when a width of the automotive pedal exceeds a distance between the two partition walls.

According to another embodiment, a pedal cover for automotive pedal comprises an elastic pad which comprises a plurality of anti-slip protrusions on an outer surface thereof and two enclosure walls integrally formed on left and right edges of an inner surface of the elastic pad with each of the two enclosure walls comprising an edge portion, a top portion and a bottom portion, wherein an underpart of the top portion is slanted down toward the edge portion and wherein a distant end part of the bottom portion is elevated toward the top portion.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the claims. Furthermore, in the detailed description of the present disclosure, numerous specific details are set forth in order to provide a thorough understanding of the present disclosure. However, it will be obvious to one of ordinary skill in the art that the present disclosure may be practiced without these specific details. In other instances, well known methods, procedures, components, and circuits have not been described in detail as not to unnecessarily obscure embodiments of the present disclosure.

The present disclosure is directed to automobile pedal covers with one-size fit all feature for automobile pedals of slightly different sizes. With the proliferation of different vehicle models, their pedals may come in different sizes, i.e., thickness, length, width, curvature, angle, etc. Thus, for those manufacturers in business of making pedal covers for the automobile pedals of different sizes, it may not be cost effective for them to manufacture a separate pedal cover for each pedal size.

Figure 1A:
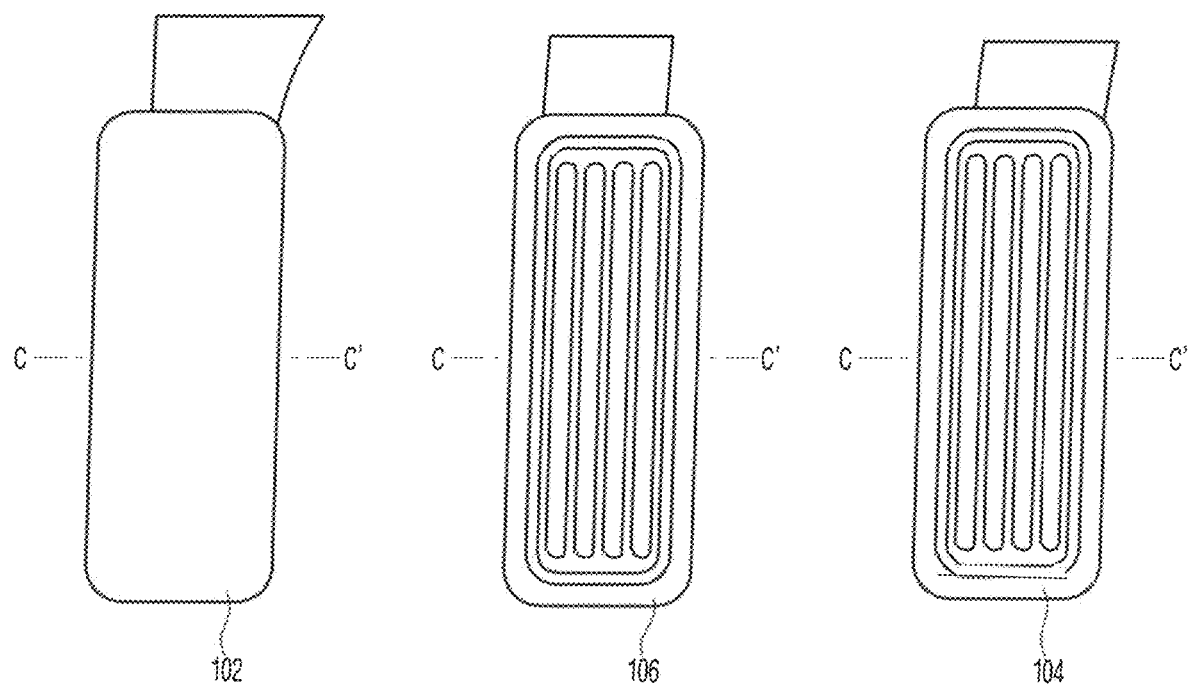
FIG. 1A is a perspective view of three different automobile pedals of similar sizes.
Figure 1B:
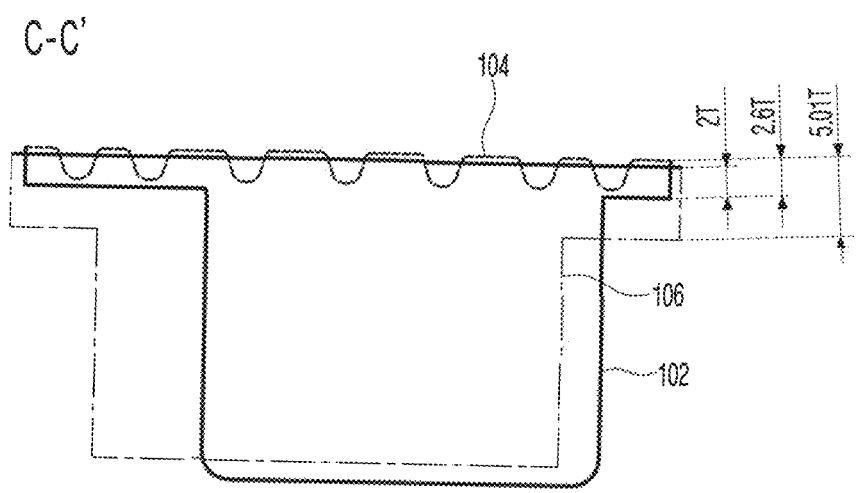
FIG. 1B is a cross-section view of C-C' of the three different automobile pedals of similar sizes from FIG. 1A.

As illustrated in FIGS. 1A and 1B, the automobile pedals may come in slightly different sizes. FIG. 1A is a perspective view of three different automobile pedals of similar sizes. FIG. 1B is a cross-section view C-C' of the three different automobile pedals of similar sizes in FIG. 1A. For example, Tesla Motors® has a 2T accelerator pedal 102 with its width at 39.0 mm, its length at 99.75 mm and its thickness at 2.0 mm, a 5T accelerator pedal 106 with its width at 40.0 mm, its length at 103.65 mm and with its thickness at 5.01 mm, and a 2.6T accelerator pedal 104 with its width at 40.4 mm, with its length at 101.2 mm and with its thickness at 2.6 mm. As readily can be seen, the 2T accelerator pedal 102, the 5T accelerator pedal 106 and the 2.6T accelerator pedal 104 have a slight difference in their width, i.e., 39.0 mm vs. 40.0 mm vs. 40.4 mm, as well as in their length, i.e., 99.75 mm vs. 103.65 mm vs. 101.2 mm. Additionally, the difference between their thickness appears to be more pronounced, i.e., 2.0 mm vs. 5.01 mm vs. 2.6 mm.

Since the cost of designing and producing pedal covers for each Tesla Motors® accelerator model, i.e., the 2T accelerator pedal 102, the 5T accelerator pedal 106 and the 2.6 accelerator pedal 104, may not be so cost effective, manufacturers of pedal covers for those pedals of Tesla Motors® may want to design a one-size fit all pedal cover for the 2T accelerator pedal 102, the 5T accelerator pedal 106 and the 2.6 accelerator pedal 104, as illustrated in FIG. 2A through FIG. 5. That is, through using the nature of elastic pad used in pedal cover of the present disclosure as well as the novel structure of the pedal cover, a single pedal cover design or model, instead of three different pedal cover designs or models, may be used to accommodate the three different pedals, namely the 2T accelerator pedal 102, the 5T accelerator pedal 106 and the 2.6 accelerator pedal 104. In similar manners, embodiments of the present disclosure propose a one-size fit all pedal cover for automobile pedals of similar sizes.

Figure 2A:
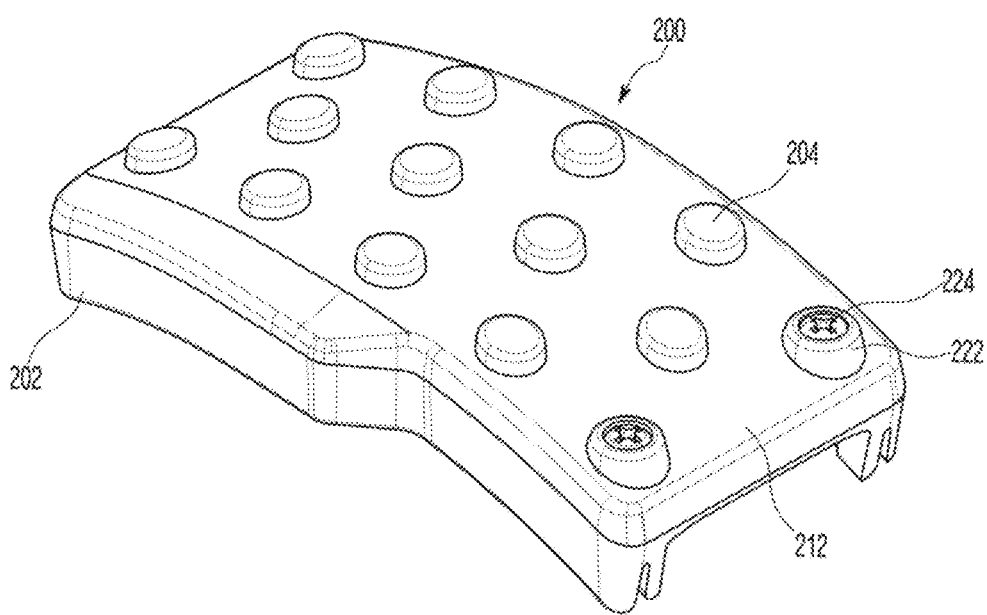
FIG. 2A is a top view of a pedal cover for the three different automobile pedals of FIGS. 1A and 1B, according to one embodiment of the present disclosure.
Figure 2B:
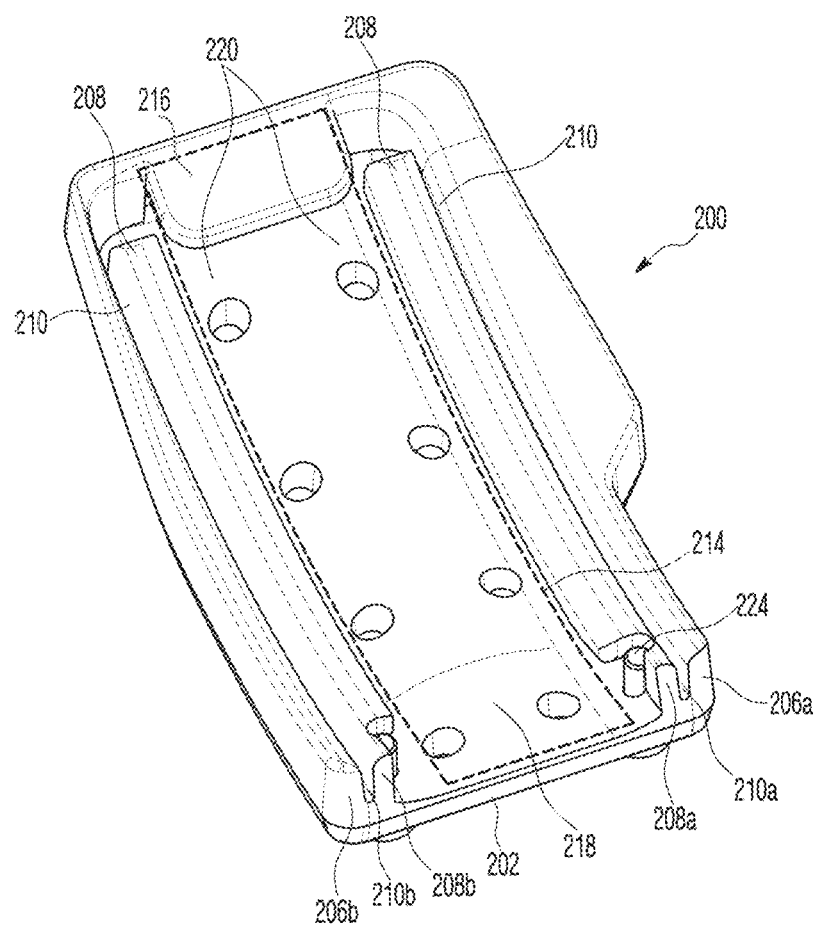
FIG. 2B is a bottom view of the pedal cover for the three different automobile pedals of FIGS. 1A and 1B, according to one embodiment of the present disclosure.

FIG. 2A is a top view of a pedal cover 200 for the three different automobile pedals of FIGS. 1A and 1B, according to one embodiment of the present disclosure. FIG. 2B is a bottom view of the pedal cover 200 for the three different automobile pedals of FIGS. 1A and 1B, according to one embodiment of the present disclosure. In FIGS. 2A and 2B, the pedal cover 200 for automotive pedal comprises an elastic pad 202 which comprises multiple anti-slip protrusions 204 on an outer surface thereof, two edge walls 206 integrally formed on left and right edges of an inner surface of the elastic pad 202, and two partition walls 208 integrally formed on the inner surface of the elastic pad 202 adjacent to the two edge walls 206 to form two channels 210.

According to the embodiment, a first channel 210a is formed between a right edge wall 206a of the two edge walls 206 and a right partition wall 208a of the two partition walls 208. In addition, a second channel 210b is formed between a left edge wall 206b of the two edge walls 206 and a left partition wall 208b of the two partition walls 208. Thus, when the pedal cover 200 is applied to a pedal of slightly large size, for example, when a width of the automotive pedal slightly exceeds a distance between the two partition walls 208 and/or the thickness of the automotive pedal slightly exceeds a capacity of the pedal cover 200 (e.g. the depth of a groove 214 in FIG. 2C), the right partition wall 208a is bent toward the right edge wall 206a via the first channel 210a and the left partition wall 208b is bent toward the left edge wall 206b via the second channel 210b to accommodate the automotive pedal.

Figure 2C:
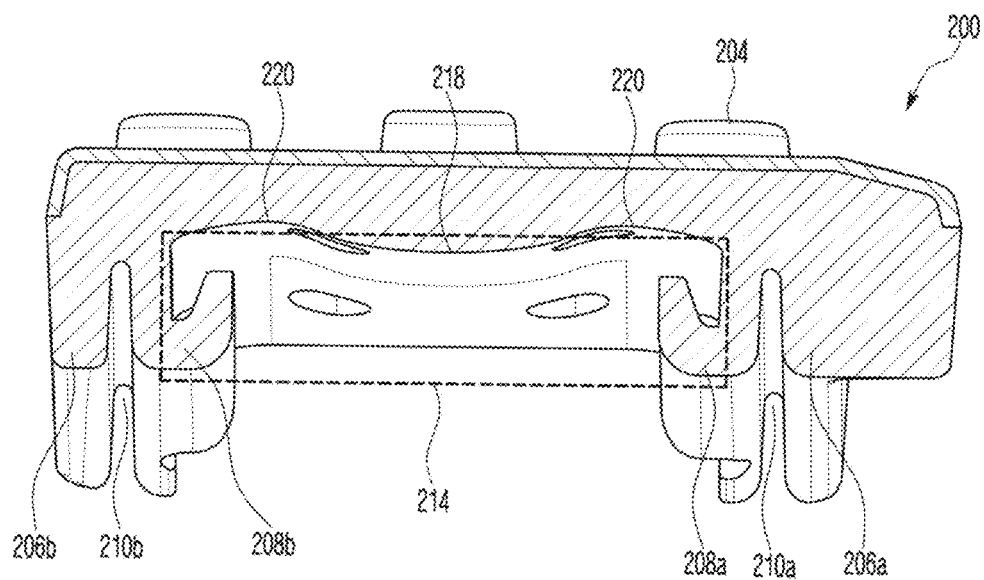
FIG. 2C is a cross-section view of the pedal cover for the three different automobile pedals of FIGS. 1A and 1B, according to one embodiment of the present disclosure.

In one embodiment, the pedal cover 200 comprises a protective cap 212 fixedly fastened to the outer surface of the elastic pad 202. According to the embodiment, the protective cap 212 and the elastic pad 202 are fastened using a countersunk hole 222 and a screw 224. In FIGS. 2A and 2C, the multiple anti-slip protrusions 204 are formed on the outer surface of the elastic pad 202. According to another embodiment, the multiple anti-slip protrusions 204 are formed on an outer surface of the protective cap 212. According to one embodiment, the elastic pad 202 is made of an elastic material, such as Thermoplastic Polyurethane (TPU), and the protective cap 212 is made of a hard material, such as stainless steel (SUS). In one embodiment, each of the two partition walls 208 is formed to wrap around the automotive pedal. According to one embodiment, the pedal cover 200 comprises the groove 214 formed on the inner surface of the elastic pad 202 between the two partition walls 208 to accommodate the automotive pedal.

Figure 4A:
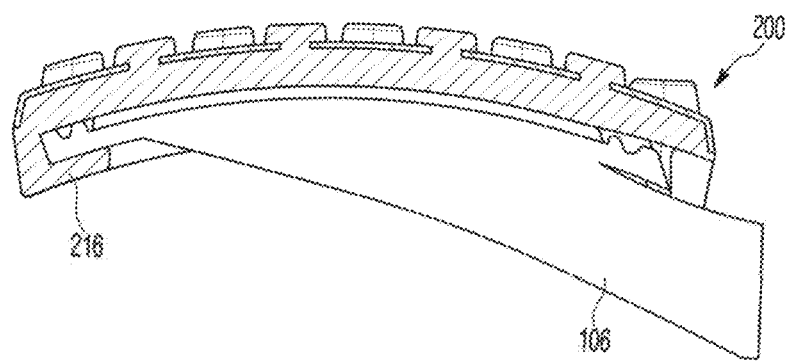
FIGS. 4A, 4B and 4C illustrate a locking projection of the pedal cover of FIGS. 2A and 2B configured to accommodate the three different automobile pedals of FIGS. 1A and 1B, according to one embodiment of the present disclosure.
Figure 4B:
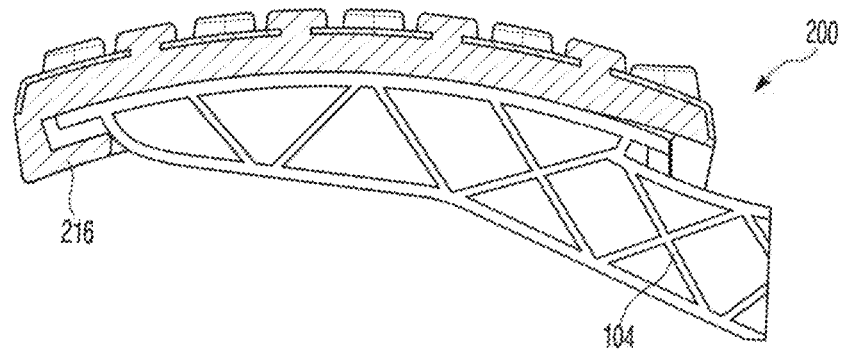
Figure 4C:
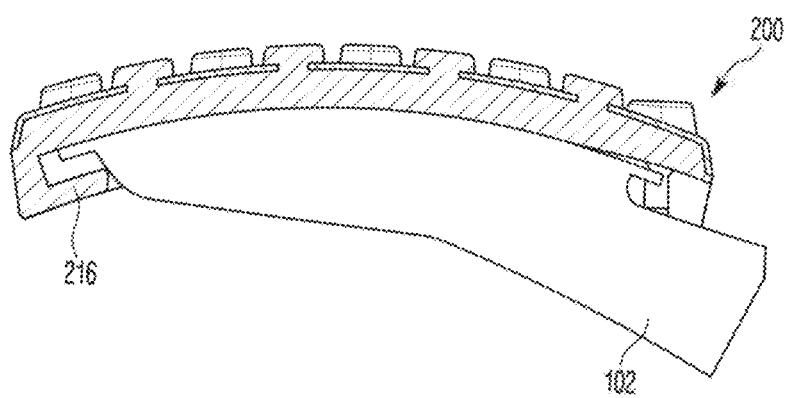

According to the embodiment, the pedal cover 200 further comprises a locking projection 216 of FIGS. 4A, 4B and 4C formed on a distant end of the elastic pad 202. The locking projection 216 is used to lock or fasten the pedal cover 200 to the automotive pedal with the help of the two partition walls 208. In one embodiment, a center part 218 of the elastic pad 202 is thicker than edge parts 220 of the elastic pad 202 adjacent to the two partitional walls 206. According to one embodiment, the locking projection 216 and the two edge walls 206 are integrally coupled. According to one embodiment, as illustrated in FIGS. 2A and 2B, the automotive pedal is an accelerator pedal. In another embodiment, the automotive pedal is a brake or a clutch.

FIG. 2C is a cross-section view of the pedal cover 200 for the three different automobile pedals of FIGS. 1A and 1B, according to one embodiment of the present disclosure. In one example embodiment, as illustrated in the cross-sectional figure, the pedal cover 200 comprises the elastic pad 202 on the inner portion thereof and the protective cap 212 fixedly fastened to the outer surface of the elastic pad 202, where the elastic pad 202 is made of Thermoplastic Polyurethane (TPU), and the protective cap 212 is made stainless steel (SUS). The two channels, namely the first channel 210*a* and the second channel 210*b*, are formed between the two partition walls 208, namely the right partition wall 208*a* and the left partition wall 208*b*, and the two edge walls 206, namely the right edge wall 206*a* and the left edge wall 206*b*, respectively.

Thus, when the pedal cover 200 is used to cover a pedal of slightly large size, for example, when a width of the automotive pedal slightly exceeds a distance between the two partition walls 208 and/or the thickness of the automotive pedal slightly exceeds a capacity of the pedal cover 200, the flexible nature of the elastic pad 202 may allow the two partition walls 208 to bent toward the edge walls 206 via the two channels 210 to accommodate the automotive pedal.

According to one embodiment, the groove 214 is formed on the inner surface of the elastic pad 202 between the two partition walls 208 to accommodate the automotive pedal. In one embodiment, the center part 218 of the elastic pad 202 is thicker than the edge parts 220 of the elastic pad 202 adjacent to the two partition walls 208 so that the friction between the automotive pedal and the pedal cover 200 may be reduced.

Figure 3A:
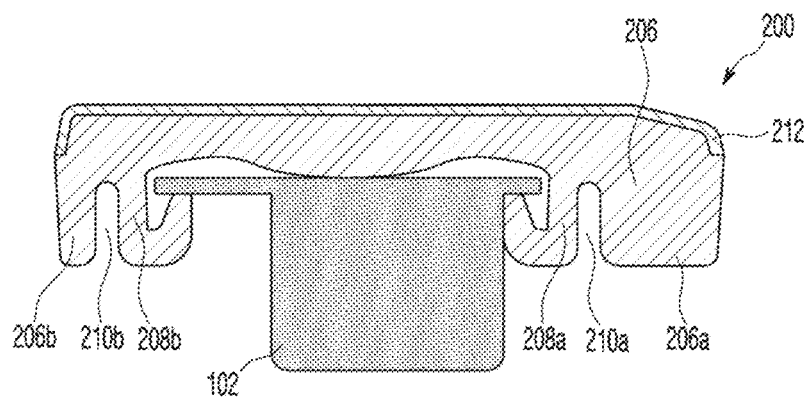
FIGS. 3A, 3B and 3C illustrate workings of the pedal cover of FIGS. 2A and 2B in accommodating the three different automobile pedals of FIGS. 1A and 1B, according to one embodiment of the present disclosure.
Figure 3B:
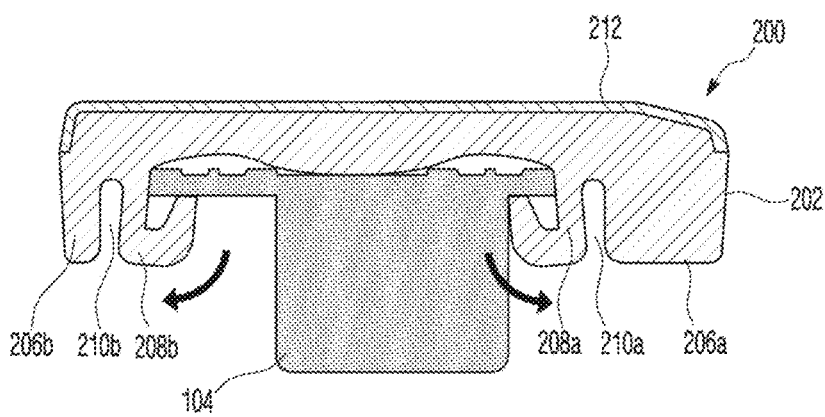
Figure 3C:
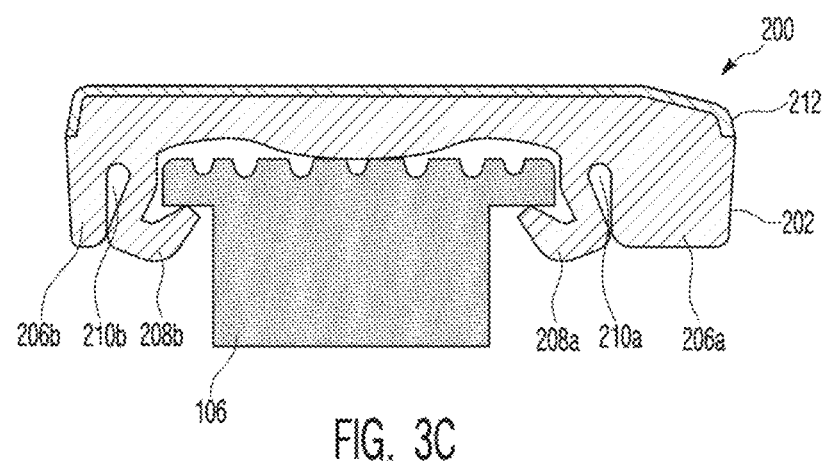

FIGS. 3A, 3B and 3C illustrate workings of the pedal cover of FIGS. 2A and 2B in accommodating the three different pedal covers of FIGS. 1A and 1B, according to one embodiment of the present disclosure. According to one embodiment, the right partition wall 208*a* is bent toward the right edge wall 206*a* via the first channel 210*a* and the left partition wall 208*b* is bent toward the left edge wall 206*b* via the second channel 210*b* when a thickness of the automotive pedal exceeds a gap between the inner surface of the elastic pad 202 and the each of the two partition walls 208.

In FIG. 3A, the pedal cover 200 is used to accommodate the 2T accelerator pedal 102. In this instance, the gap between the inner surface of the elastic pad 202 and the partition walls 208 is greater than the thickness of the 2T accelerator pedal 102. Accordingly, there is no deformation of the partition walls 208. In FIG. 3B, the pedal cover 200 is used to accommodate the 2.6T accelerator pedal 104. In this instance, the gap between the inner surface of the elastic pad 202 and the partition walls 208 is slightly less than the thickness of the 2.6T accelerator pedal 104. Accordingly, there is a slight deformation of the partition walls 208, where the partition walls 208 are pushed away from the 2.6T accelerator pedal 104. In FIG. 3C, the pedal cover 200 is used to accommodate the 5T accelerator pedal 106. In this instance, the gap between the inner surface of the elastic pad 202 and the partition walls 208 is substantially less than the thickness of the 5T accelerator pedal 106. Accordingly, there is a substantial deformation of the partition walls 208, where the partition walls 208 are pushed away from the 5T accelerator pedal 106.

FIGS. 4A, 4B and 4C illustrate the locking projection 216 of the pedal cover of FIGS. 2A and 2B configured to accommodate the three different pedal covers of FIGS. 1A and 1B, according to one embodiment of the present disclosure. The locking projection 216 formed on the distant end of the elastic pad 202 is used to lock and/or stabilize the automotive pedal flanked by the two partition walls 208 of the pedal cover 200. In FIG. 4A, the length of the 5T accelerator pedal 106, i.e., 103.65 mm, is just right for the length of the pedal cover 200. However, the length of the 2T accelerator pedal 102 or the 2.6T accelerator pedal 104, i.e., 99.75 mm or 101.2 mm, is less than the length of the pedal cover 200. In this instance, as illustrated in FIGS. 4B and 4C, the locking projection 216 is used to prevent the 2T accelerator pedal 102 or the 2.6T accelerator pedal 104 from overreaching the distant end of the pedal cover 200, thus maintaining the stability between the pedal cover 200 and the 2T accelerator pedal 102 or the 2.6T accelerator pedal 104.

Figure 5:
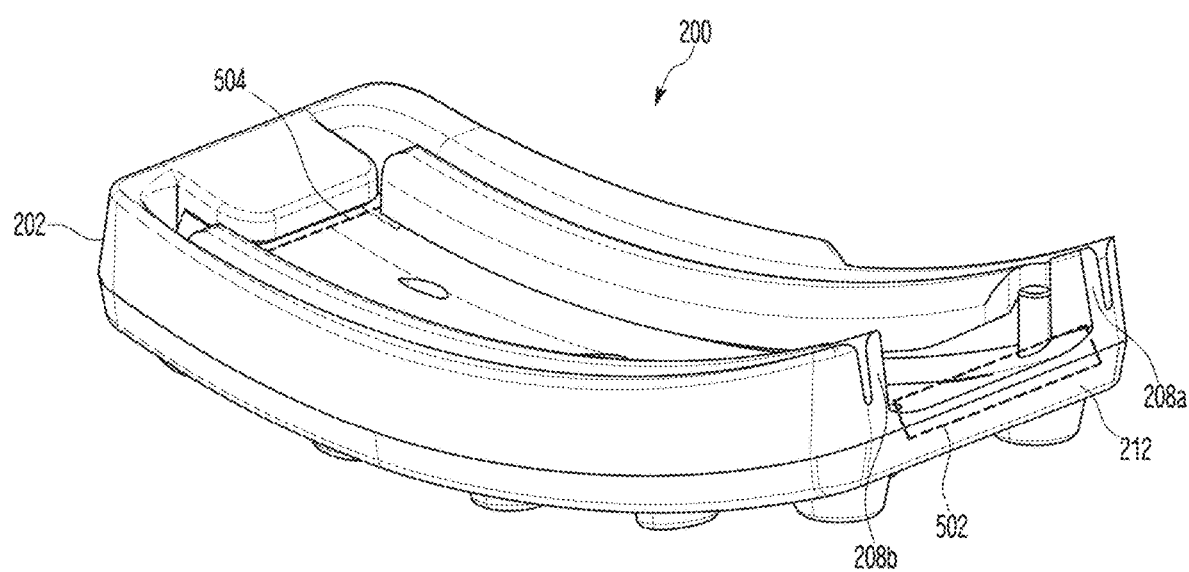
FIG. 5 illustrates a perspective view of the pedal cover of FIGS. 2A and 2B with an opening for smoothly sliding into the three different automobile pedals of FIGS. 1A and 1B, according to one embodiment of the present disclosure.

FIG. 5 illustrates a perspective view of the pedal cover 200 of FIGS. 2A and 2B with an opening for sliding into the three different automobile pedals of FIGS. 1A and 1B, according to one embodiment of the present disclosure. According to the embodiment, a width of a close end 502 of the groove 214 is slightly wider than a width of a distant end 504 of the groove 214, thus making it easy for the automotive pedals to slide into the pedal cover 200. It is appreciated that the width of the close end 502 and the width of the distant end 504 may be obtained by measuring the distance between the partition walls 208 of the respective locations.

Figure 6A:
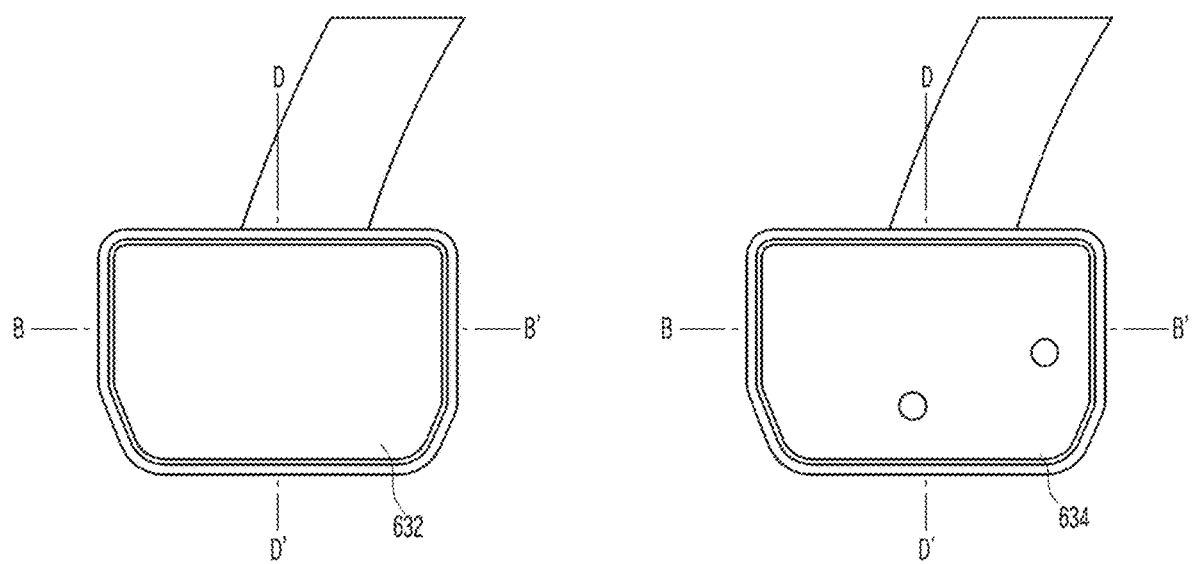
FIG. 6A is a perspective view of two different automobile pedals of similar sizes.
Figure 6B:
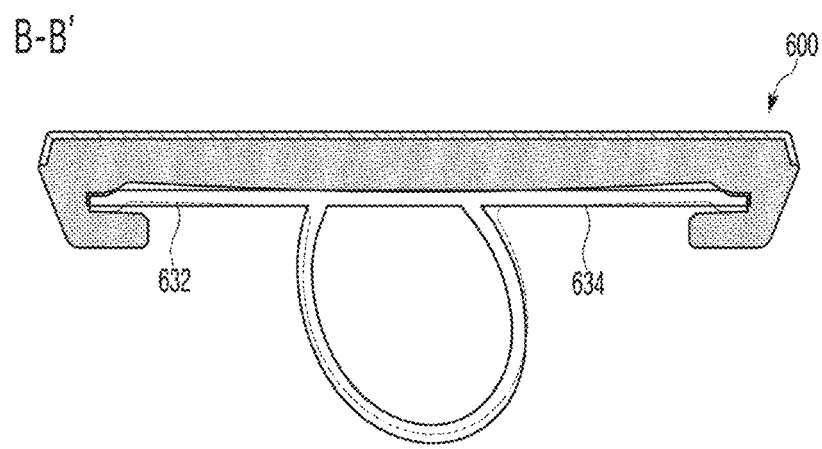
FIG. 6B is a cross-section view of B-B' of the two different automobile pedals of similar sizes from FIG. 6A.
Figure 6C:
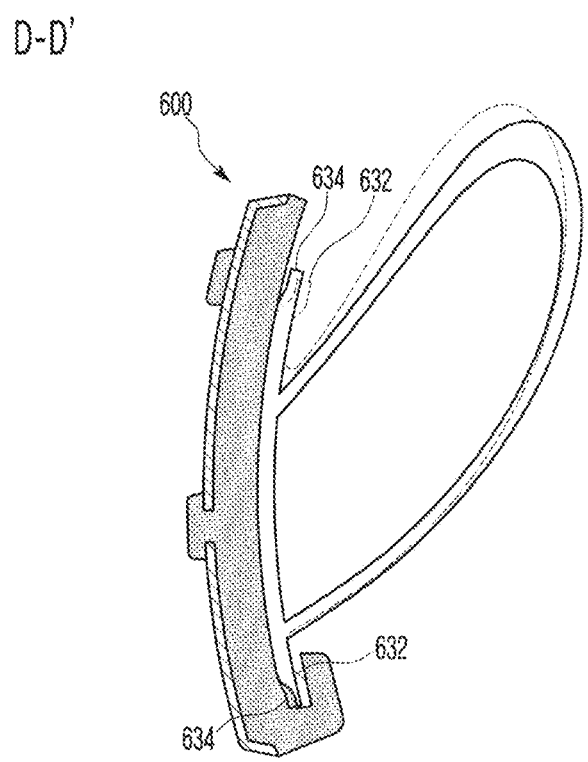
FIG. 6C is a cross-section view of D-D' of the two different automobile pedals of similar sizes from FIG. 6A.

FIG. 6A is a perspective view of two different automobile pedals of similar sizes. FIG. 6B is a cross-section view of B-B' of the two different automobile pedals of similar sizes from FIG. 6A. FIG. 6C is a cross-section view of D-D' of the two different automobile pedals of similar sizes from FIG. 6A. In one example, Tesla Motors® has a brake pedal for Model 3® and Model Y® 632 with its length at 90.8 mm, its width at 62.8 mm and its thickness at 2.2 mm and a brake pedal for Model Y Juniper® 634 with its length at 92.0 mm, its width at 64.4 mm and with its thickness at 1.8 mm. As readily can be seen, the brake pedal for Model 3® and Model Y® 632 and the brake pedal for Model Y Juniper® 634 have a slight difference in their length, i.e., 90.8 mm vs. 92.0 as well as in their width, i.e., 62.8 mm vs. 64.4. Additionally, the difference between their thickness appears to be slight as well, i.e., 2.2 mm vs. 1.8 mm. Further, as illustrated in FIGS. 6B and 6C, a conventional pedal cover 600, which was designed to accommodate the brake pedal for Model 3® and Model Y® 632, may not work well for the brake pedal for Model Y Juniper® 634.

Figure 7A:
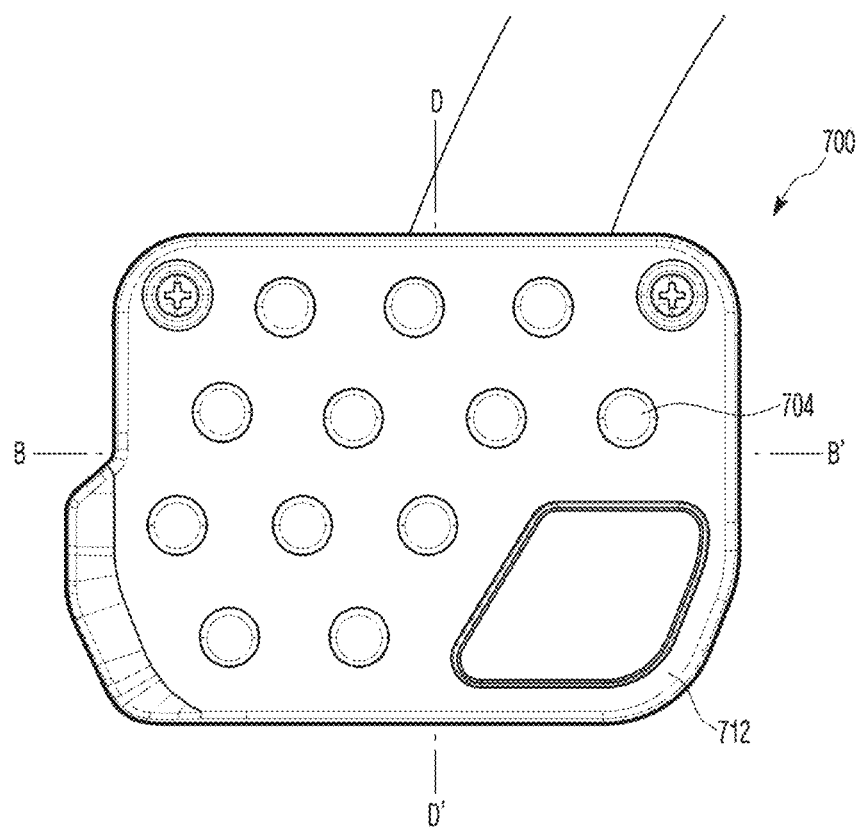
FIG. 7A is a top view of a pedal cover for the two different automobile pedals of FIGS. 6A, 6B and 6C, according to one embodiment of the present disclosure.
Figure 7B:
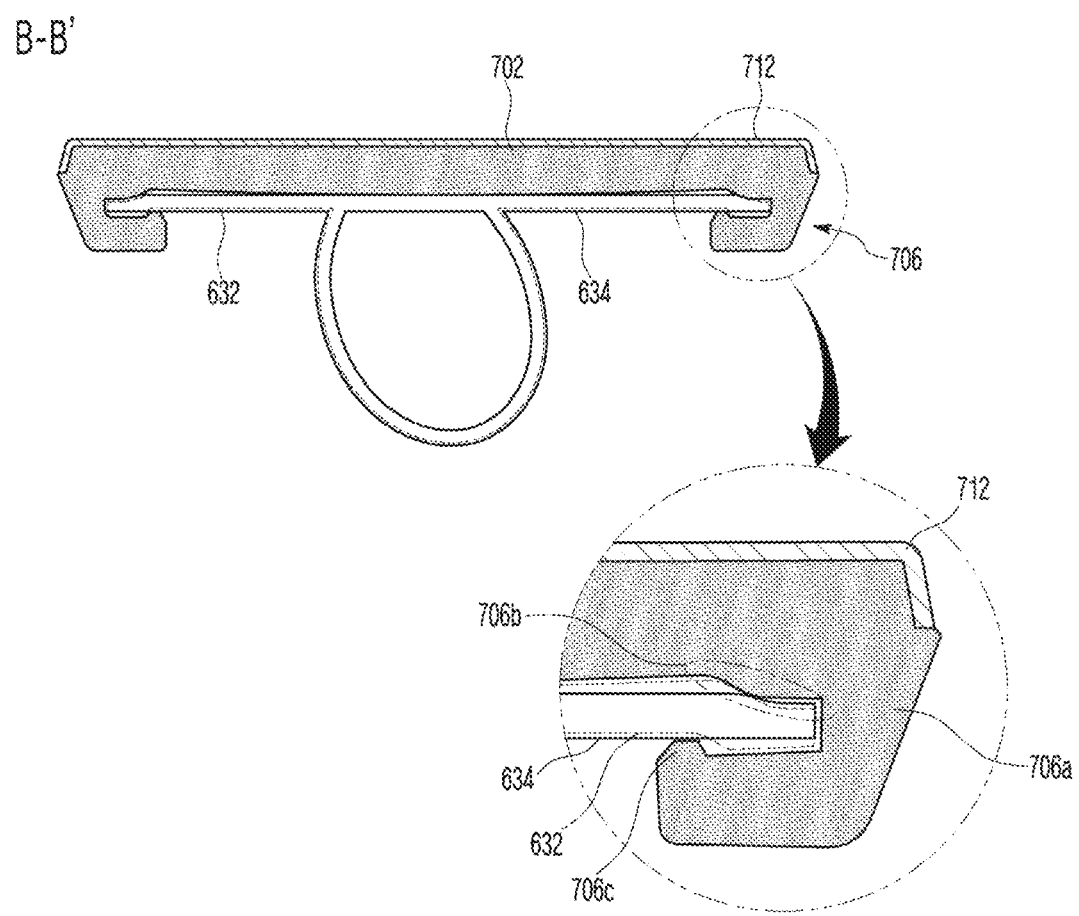
FIG. 7B is a cross-section view of B-B' of the pedal cover of FIG. 7A for the two different automobile pedals of FIGS. 6A, 6B and 6C, according to one embodiment of the present disclosure.
Figure 7C:
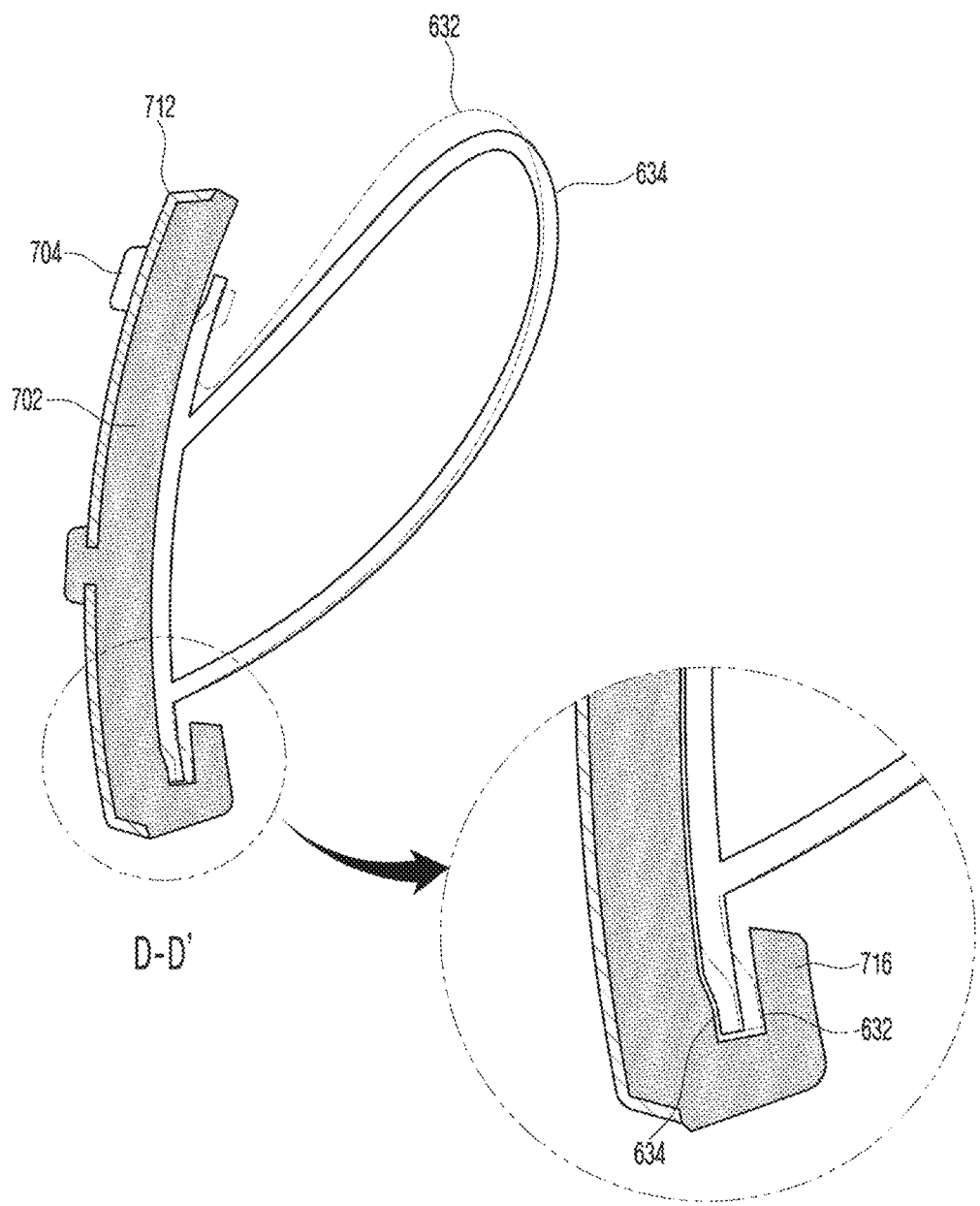
FIG. 7C is a cross-section view of D-D' of the pedal cover of FIG. 7A for the two different automobile pedals of FIGS. 6A, 6B and 6C, according to one embodiment of the present disclosure.

Since the cost of designing and producing pedal covers for each Tesla Motors® brake model, i.e., the brake pedal for Model 3® and Model Y® 632 and the brake pedal for Model Y Juniper® 634, may not be so cost effective, manufacturers of brake pedal covers for those pedals of Tesla Motors® may want to design a one-size fit all pedal cover for the brake pedal for Model 3® and Model Y® 632 as well as the brake pedal for Model Y Juniper® 634, as illustrated in FIG. 7A through FIG. 7C. That is, through using the nature of elastic pad used in pedal cover of the present disclosure as well as the novel structure of the pedal cover, a single pedal cover design or model, instead of the two different pedal cover designs or models, may be used to accommodate the two different brake pedals, namely the brake pedal for Model 3® and Model Y® 632 and the brake pedal for Model Y Juniper® 634. In similar manners, embodiments of the present disclosure propose a one-size fit all pedal cover for automobile pedals of similar sizes.

FIG. 7A is a top view of a pedal cover 700 configured to accommodate the two different automobile pedals of FIGS. 6A, 6B and 6C, according to one embodiment of the present disclosure. FIG. 7B is a cross-section view of B-B' of the pedal cover 700 of FIG. 7A for the two different automobile pedals of FIGS. 6A and 6B, according to one embodiment of the present disclosure. FIG. 7C is a cross-section view of D-D' of the pedal cover 700 of FIG. 7A for the two different automobile pedals of FIGS. 6A and 6B, according to one embodiment of the present disclosure.

In FIGS. 7A, 7B and 7C, the pedal cover 700 for automotive pedal comprises an elastic pad 702 which comprises a plurality of anti-slip protrusions 704 on an outer surface thereof and two enclosure walls 706 integrally formed on left and right edges of an inner surface of the elastic pad 702 with each of the two enclosure walls 706 comprising an edge portion 706a, a top portion and a bottom portion. According to the embodiment, an underpart 706b of the top portion is slanted down toward the edge portion 706a and a distant end part 706c of the bottom portion is elevated toward the top portion.

According to one embodiment, the pedal cover 700 further comprises a protective cap 712 fixedly fastened to the outer surface of the elastic pad 702, wherein the elastic pad 702 is made of Thermoplastic Polyurethane (TPU) and the protective cap 712 is made of a stainless steel (SUS). In FIG. 7C, the multiple anti-slip protrusions 704 are formed on the outer surface of the elastic pad 702. According to another embodiment, the multiple anti-slip protrusions 704 are formed on an outer surface of the protective cap 712. In one example embodiment, the each of the two enclosure walls 706 is formed to wrap around the automotive pedal. According to one embodiment, the pedal cover 700 further comprises a locking projection 716 formed on a distant end of the elastic pad 702 to lock the automotive pedal flanked by the two enclosure walls 706. Although the pedal cover 700 is used to cover the brake pedals in this example, the pedal cover 700 may be used to cover accelerators or clutches, according to an alternative embodiment.

The present disclosure includes multiple embodiments of pedal covers built or designed for accommodating automotive pedals of slightly different sizes. Thus, the manufacturers of pedal covers may be able to design a one-size fit all accelerator pedals, brake pedals or clutch pedals. That is, through using the nature of elastic pad used in pedal covers of the present disclosure as well as the novel structure of the pedal covers befitting particular instances, a single pedal cover design or model, instead of multiple different pedal cover designs or models, may be used to accommodate the multiple different pedals, thus reducing the design and/or manufacturing cost as well as other resources.

It is to be understood that this disclosure is not limited to particular embodiments or embodiments described, as such may vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided may be different from the actual publication dates which may need to be independently confirmed.

It is noted that, as used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order which is logically possible.

Although the foregoing disclosure has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the disclosure. It will be appreciated that those skilled in the art will be able to devise various arrangements which, although not explicitly described or shown herein, embody the principles of the disclosure and are included within its spirit and scope. Furthermore, all examples and conditional language recited herein are principally intended to aid the reader in understanding the principles of the disclosure and the concepts contributed by the inventors to furthering the art, and are to be construed as being without limitation to such specifically recited examples and conditions. Moreover, all statements herein reciting principles, embodiments, and embodiments of the disclosure as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the exemplary embodiments shown and described herein. Rather, the scope and spirit of present disclosure is embodied by the appended claims.

What is claimed is:

1. A pedal cover for an automotive pedal, the pedal cover comprising:
an elastic pad comprising:
a plurality of anti-slip protrusions on an outer surface thereof; and
two enclosure walls integrally formed on left and right edges of an inner surface of the elastic pad with each of the two enclosure walls comprising an edge portion, a top portion and a bottom portion,
wherein an underpart of the top portion is slanted down toward the edge portion and wherein an end part of the bottom portion is elevated toward the top portion.

2. The pedal cover of claim 1, further comprising a protective cap fixedly fastened to the outer surface of the elastic pad.

3. The pedal cover of claim 2, wherein the elastic pad is made of Thermoplastic Polyurethane (TPU) and the protective cap is made of a stainless steel (SUS).

4. The pedal cover of claim 1, wherein the each of the two enclosure walls is formed to wrap around the automotive pedal.

5. The pedal cover of claim 4, further comprising a locking projection formed on an end of the elastic pad to lock the automotive pedal flanked by the two enclosure walls.

6. The pedal cover of claim 1, wherein the automotive pedal is a brake pedal.

7. The pedal cover of claim 1, wherein the automotive pedal is an accelerator or a clutch.

8. A pedal cover for an automotive pedal, the pedal cover comprising:
an elastic pad comprising:
a plurality of anti-slip protrusions on an outer surface thereof;
two edge walls integrally formed on left and right edges of an inner surface of the elastic pad; and
two partition walls integrally formed on the inner surface of the elastic pad adjacent to the two edge walls to form two channels,
wherein a first channel of the two channels is formed between a right edge wall of the two edge walls and a right partition wall of the two partition walls and a second channel of the two channels is formed between a left edge wall of the two edge walls and a left partition wall of the two partition walls, and
wherein the right partition wall is bent toward the right edge wall via the first channel and the left partition wall is bent toward the left edge wall via the second channel when a width of the automotive pedal exceeds a distance between the two partition walls.

9. The pedal cover of claim 8, further comprising a protective cap fixedly fastened to the outer surface of the elastic pad.

10. The pedal cover of claim 9, wherein the elastic pad is made of Thermoplastic Polyurethane (TPU) and the protective cap is made of a stainless steel (SUS).

11. The pedal cover of claim 9, wherein the protective cap and the elastic pad are fastened using a countersunk hole and a screw.

12. The pedal cover of claim 8, wherein each of the two partition walls is formed to wrap around the automotive pedal.

13. The pedal cover of claim 8, further comprising a groove formed on the inner surface of the elastic pad between the two partition walls to accommodate the automotive pedal.

14. The pedal cover of claim 13, further comprising a locking projection formed on an end of the elastic pad to lock the automotive pedal flanked by the two partition walls.

15. The pedal cover of claim 14, wherein the locking projection and the two edge walls are integrally coupled.

16. The pedal cover of claim 13, wherein the right partition wall is bent toward the right edge wall via the first channel and the left partition wall is bent toward the left edge wall via the second channel when a thickness of the automotive pedal exceeds a gap between the inner surface of the elastic pad and the each of the two partition walls.

17. The pedal cover of claim 13, wherein a width of a first end of the groove is wider than a width of a second end of the groove which is different from the first end of the groove.

18. The pedal cover of claim 8, wherein a center part of the elastic pad is thicker than edge parts of the elastic pad adjacent to the two partitional walls.

19. The pedal cover of claim 8, wherein the automotive pedal is an accelerator pedal.

20. The pedal cover of claim 8, wherein the automotive pedal is a brake or a clutch.

* * * * *